(12) United States Patent
Sperl et al.

(10) Patent No.: US 12,169,993 B2
(45) Date of Patent: Dec. 17, 2024

(54) FILLING OF BOXES FOR VALUABLE DOCUMENTS

(71) Applicant: GIESECKE+DEVRIENT CURRENCY TECHNOLOGY GMBH, Munich (DE)

(72) Inventors: Markus Sperl, Garching (DE); Andreas Jakobs, Munich (DE); Wolfgang Koniger, Karlsfeld (DE); Michael Knickrehm, Augsburg (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 752 days.

(21) Appl. No.: 16/613,902

(22) PCT Filed: May 15, 2018

(86) PCT No.: PCT/EP2018/000256
§ 371 (c)(1),
(2) Date: Nov. 15, 2019

(87) PCT Pub. No.: WO2018/210447
PCT Pub. Date: Nov. 22, 2018

(65) Prior Publication Data
US 2021/0074111 A1    Mar. 11, 2021

(30) Foreign Application Priority Data
May 15, 2017    (DE) .......................... 102017004641.7

(51) Int. Cl.
*G07D 11/12* (2019.01)
*B25J 9/02* (2006.01)
(Continued)

(52) U.S. Cl.
CPC .............. *G07D 11/12* (2019.01); *B25J 9/026* (2013.01); *B65H 5/08* (2013.01); *B65H 29/003* (2013.01);
(Continued)

(58) Field of Classification Search
CPC ........ G07D 11/12; G07D 11/16; G07D 11/17; G07D 11/10; G07D 11/40; G07D 11/165;
(Continued)

(56) References Cited

U.S. PATENT DOCUMENTS 3,885,692 A * 5/1975 Anderson, Jr. ......... B66F 9/195
414/661
4,297,070 A * 10/1981 Didtel ...................... B66F 9/24
414/661
(Continued)

FOREIGN PATENT DOCUMENTS

CN    101238056 A    8/2008
CN    104245553 A    12/2014
(Continued)

OTHER PUBLICATIONS

English Translation of EP 0377399 A1 (Year: 1990).*
(Continued)

*Primary Examiner* — Jeffrey A Shapiro
(74) *Attorney, Agent, or Firm* — Workman Nydegger

(57) ABSTRACT

The filling of value documents cassettes involves a cassette receiving device for receiving a value document cassette and a gripping device for transporting a value document stack from a value document container into the value document cassette. The apparatus optionally has a formatting device for the automatic alignment of a value document stack removed from the value document container before the stack is inserted in the value document cassette. A finger element is attached to the transport device of the gripping device, and
(Continued)

besides the gripping device, the finger element is guided into the value document cassette before the value documents are inserted.

9 Claims, 7 Drawing Sheets

(51) Int. Cl.
    *B25J 15/00*     (2006.01)
    *B65H 5/08*     (2006.01)
    *B65H 29/00*     (2006.01)
    *G07D 11/16*     (2019.01)
    *G07D 11/17*     (2019.01)
(52) U.S. Cl.
    CPC ............ *G07D 11/16* (2019.01); *G07D 11/17* (2019.01); *B65H 2301/422542* (2013.01); *B65H 2301/422548* (2013.01); *B65H 2701/1912* (2013.01)
(58) Field of Classification Search
    CPC ........ B25J 9/026; B25J 15/0014; B25J 15/08; B25J 15/106; B65H 5/08; B65H 29/003; B65H 2301/422542; B65H 2301/422548; B65H 2701/1912; B65H 2301/42242; B65H 31/00; B65H 31/34; B65H 31/38; B65H 31/40; B65H 2405/57; B65H 2405/572; B65H 2405/573; B65H 2405/581; B65H 2406/35; B65H 5/12; B65H 5/14; B65H 9/10; B65H 9/12; B65H 29/02; B65H 29/045; B65H 29/047; B65H 29/28; B65H 2301/4354; B65H 2301/44338; B65H 2301/4471; B65H 2405/50; B65G 17/323; B65G 21/2018; B65G 59/04; B65G 15/323; B65G 15/58; B65G 47/907; B65G 47/91; B65G 47/92; B65G 49/061; B65G 49/068; B65G 57/301; B65G 60/00; B65G 61/00
    See application file for complete search history.

(56) References Cited

U.S. PATENT DOCUMENTS

| | | | |
|---|---|---|---|
| 5,101,979 A | | 4/1992 | Uno et al. |
| 5,193,973 A * | | 3/1993 | Tubke .................. B65G 57/00 |
| | | | 108/52.1 |
| 5,577,873 A * | | 11/1996 | Tanaka ..................... B66F 9/18 |
| | | | 414/400 |
| 6,390,756 B1 | | 5/2002 | Isaacs et al. |
| 6,398,107 B1 | | 6/2002 | Neri |
| 7,325,667 B1 * | | 2/2008 | Damick ................. B65G 59/02 |
| | | | 198/395 |
| 7,637,711 B2 * | | 12/2009 | Wronski ................ B65H 31/06 |
| | | | 414/793 |
| 7,677,545 B2 | | 3/2010 | Iwami et al. |
| 7,789,226 B2 * | | 9/2010 | Carrigan ................ B65D 71/02 |
| | | | 206/451 |
| 9,514,593 B2 | | 12/2016 | Dopfer et al. |
| 9,573,787 B2 | | 2/2017 | Sperl et al. |
| 2003/0120387 A1 | | 6/2003 | Sherwin |
| 2008/0230981 A1 | | 9/2008 | Iwami et al. |
| 2009/0162181 A1* | | 6/2009 | Ryf ........................ B65G 57/03 |
| | | | 414/788.1 |
| 2010/0074720 A1* | | 3/2010 | Taylor .................. B25J 15/0019 |
| | | | 414/412 |
| 2010/0289211 A1* | | 11/2010 | Nireki .................... B65H 29/46 |
| | | | 271/226 |
| 2012/0175217 A1* | | 7/2012 | Demmeler ............ B65H 1/027 |
| | | | 194/206 |
| 2012/0282074 A1* | | 11/2012 | Thies .................... B65H 29/32 |
| | | | 414/789.9 |
| 2014/0367395 A1* | | 12/2014 | Newhouse ............ B65H 1/027 |
| | | | 220/660 |
| 2015/0093230 A1* | | 4/2015 | Sperl .................. B65H 31/3045 |
| | | | 414/800 |
| 2015/0179013 A1* | | 6/2015 | Dopfer ..................... B65H 1/28 |
| | | | 414/811 |
| 2016/0189465 A1* | | 6/2016 | Neuhauser ............. G07D 11/12 |
| | | | 700/224 |
| 2016/0217640 A1* | | 7/2016 | Schmitz ................. G07D 11/20 |
| 2018/0276933 A1* | | 9/2018 | Nakanishi ............... B25J 15/10 |
| 2019/0382212 A1* | | 12/2019 | Hansl ..................... B65G 57/22 |

FOREIGN PATENT DOCUMENTS

| | | | | |
|---|---|---|---|---|
| DE | 19857614 A1 | | 6/2000 | |
| DE | 102012022922 A1 | | 5/2014 | |
| DE | 102011082967 A1 * | | 3/2023 | ............ B54H 3/32 |
| EP | 0377399 A1 * | | 7/1990 | ............ B65G 61/00 |
| RU | 2634245 C2 | | 10/2017 | |
| WO | 2006086160 A1 | | 8/2006 | |
| WO | 2013159900 A1 | | 10/2013 | |

OTHER PUBLICATIONS

English Translation of DE 102011082967 A1 (Year: 2013).*
Office Action from corresponding Chinese Application No. 201880032382.2, Dec. 6, 2021.
International Search Report and Written Opinion from PCT Application No. PCT/EP2018/000256, Jul. 25, 2018.

* cited by examiner

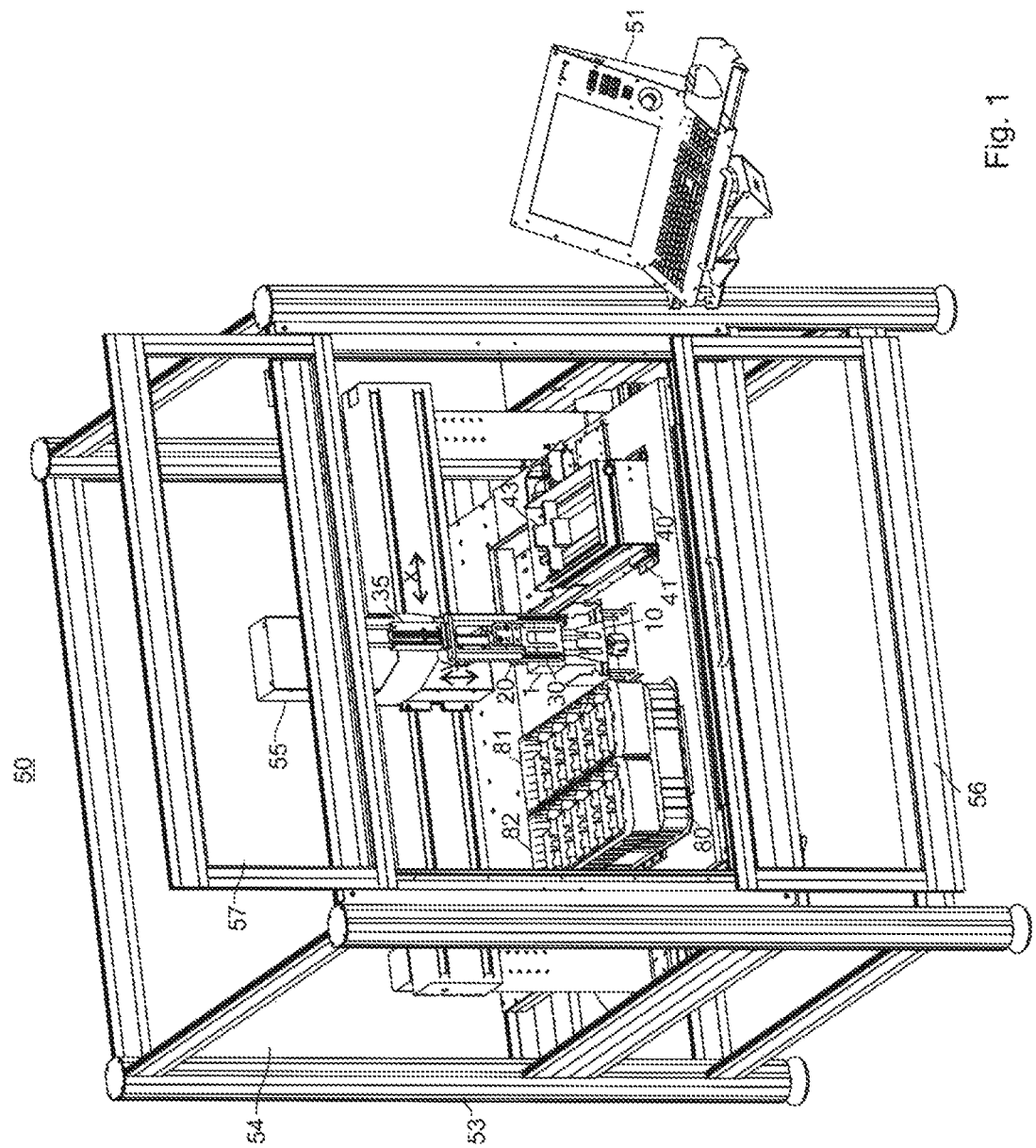

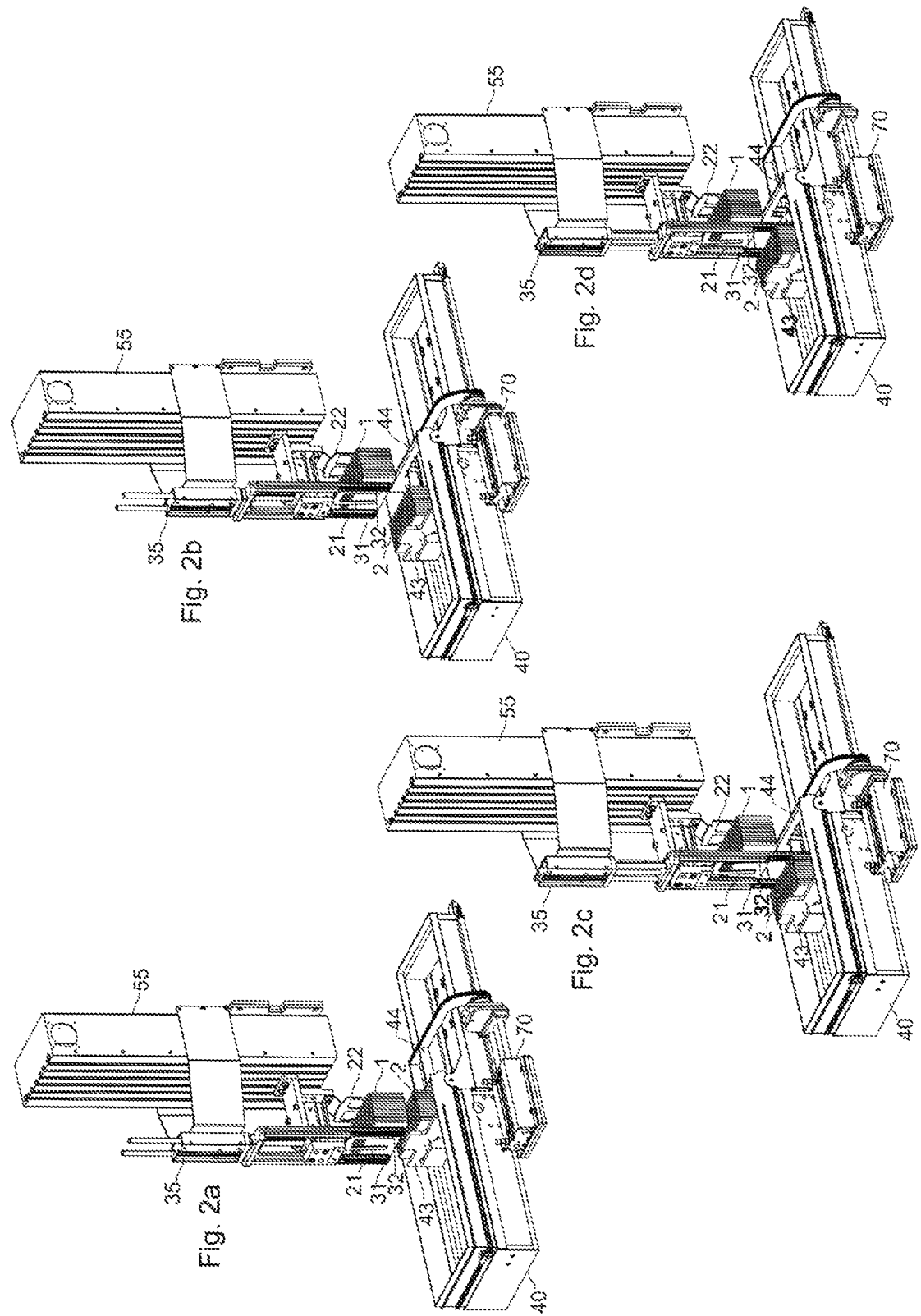

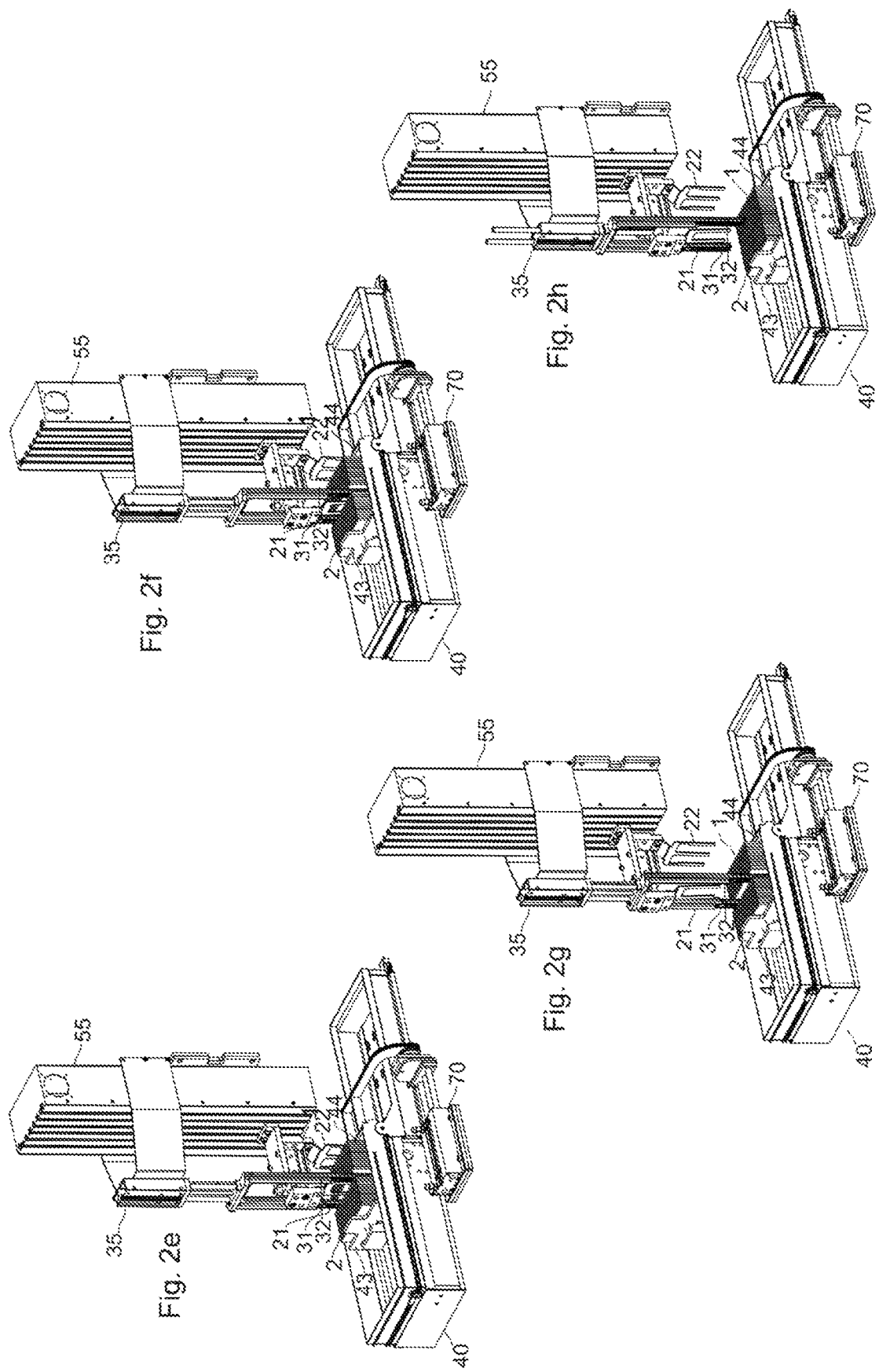

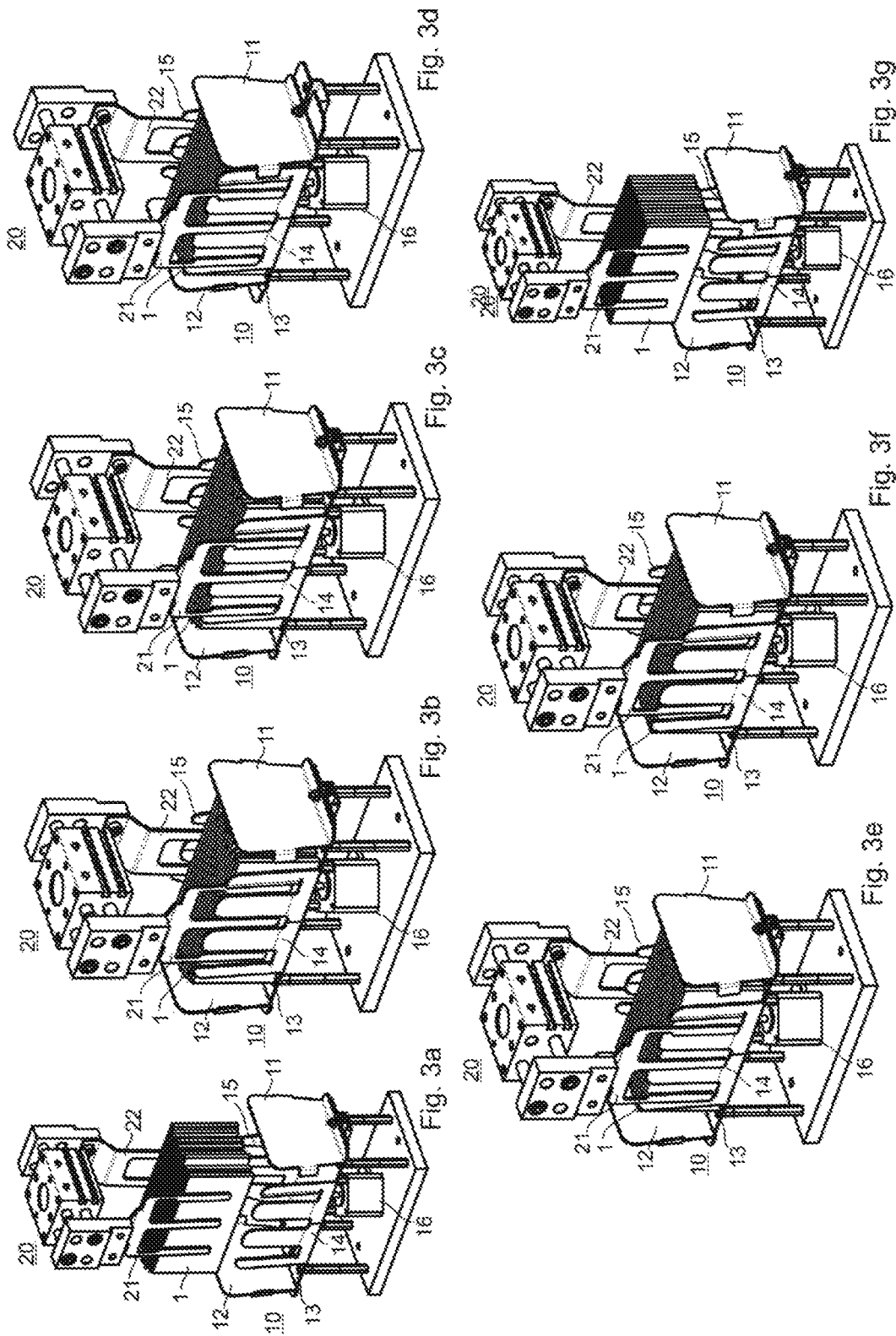

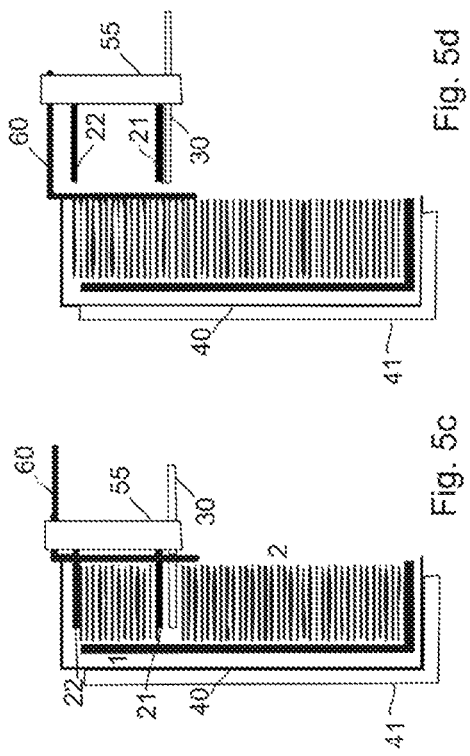
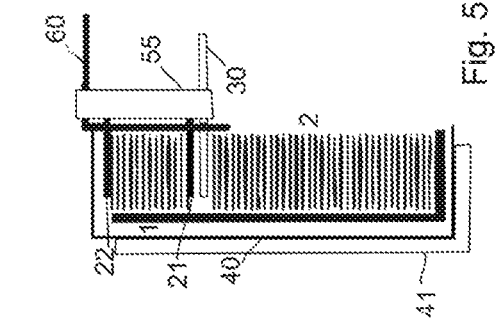
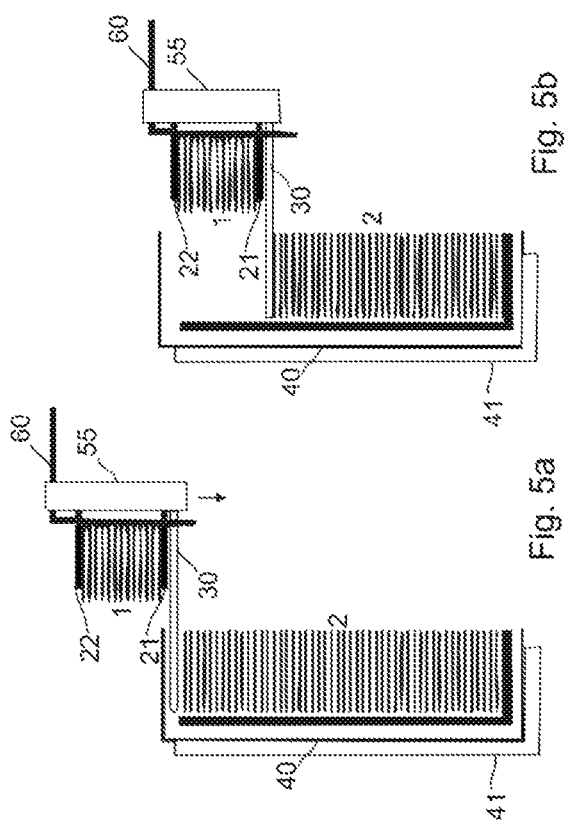
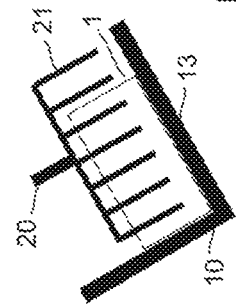
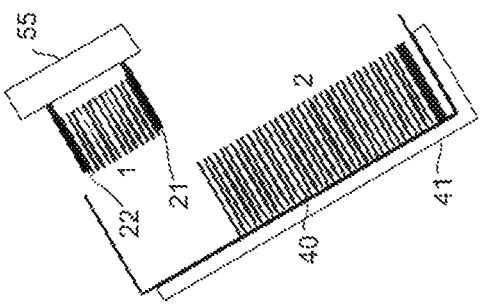

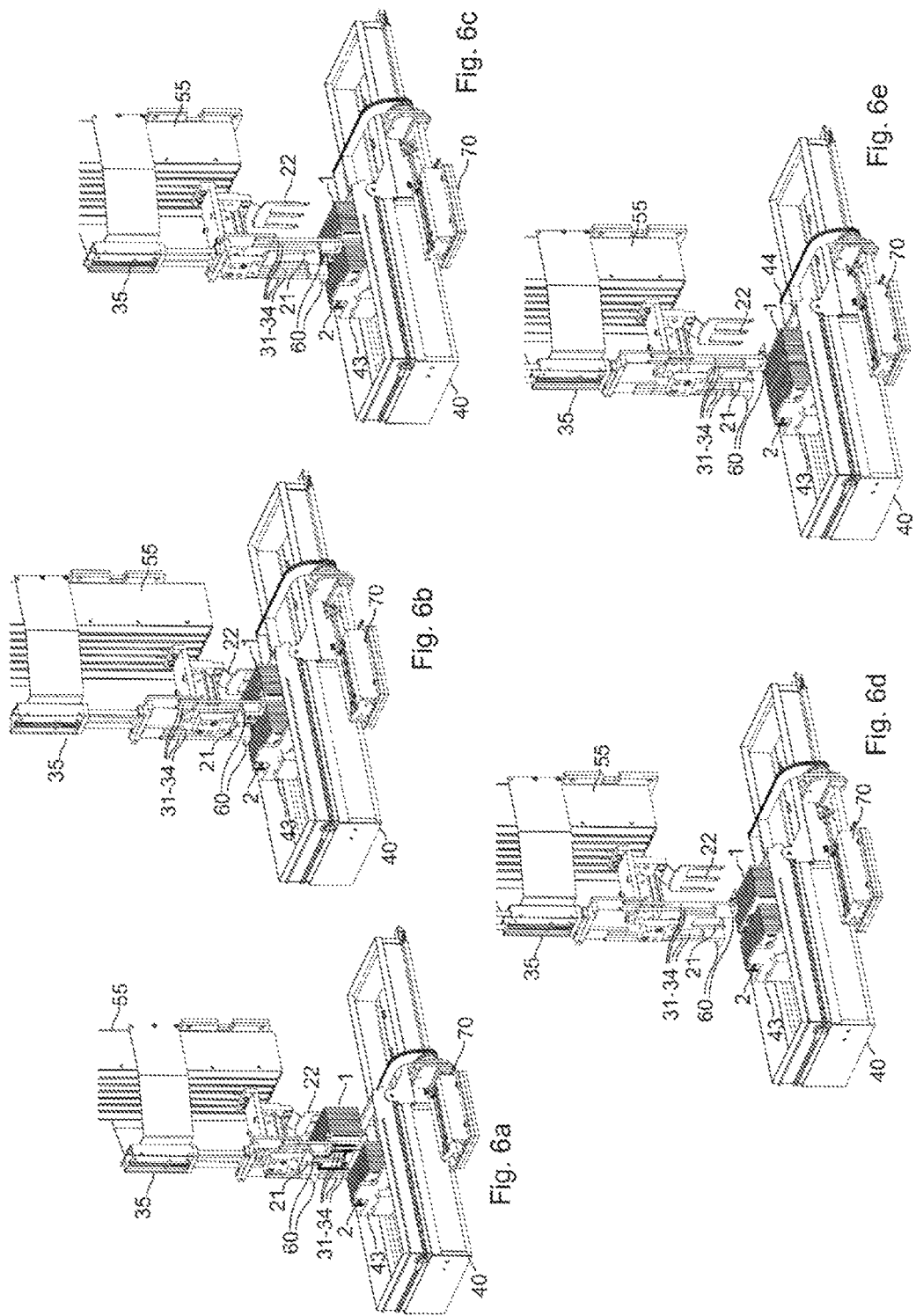

FILLING OF BOXES FOR VALUABLE DOCUMENTS

BACKGROUND

The invention relates to an apparatus and a method for filling value document cassettes with value documents.

When processing banknotes and other value documents, stable value document cassettes are used for receiving the value documents, for example for secure transport. Value document cassettes are configured for the automatic removal of value documents in a self-service appliance. The value document cassettes can be cassettes for banknotes, but other value documents can be stored in such cassettes as well, such as, for example, vouchers, tickets, checks, or similar.

The known cassettes for banknotes can be used in self-service appliances, which are configured to automatically remove the banknotes from the cassettes. Such self-service devices can, for example, be automated teller machines (ATMs), which pay out a certain amount to an operator and debit the amount paid out from an account of the operator. This amount is then composed of banknotes removed from the cassettes contained in the cash dispenser and dispensed to the operator. It is customary here that at least one separate cassette is used for each denomination. The self-service appliances can also be adapted to accept banknotes input by an operator and to deposit them in one or several cassettes and to credit an amount thus determined to the account of the operator.

When the cassettes of a self-service device become empty over time due to the payouts, they must be replaced by other cassettes filled with banknotes of the respective denomination. For this purpose, emptied or partially emptied cassettes are removed from the self-service appliance and subsequently refilled with banknotes so that they can be employed again in a self-service appliance.

Up to now, value document cassettes have usually been filled manually. In addition, it has been proposed to fill value document cassettes fully automatically with the aid of a value document processing apparatus, wherein in a sorting apparatus for banknotes the dispensing of the banknotes of the same denomination is effected directly into a cassette. For this purpose the cassette is positioned at the end of the transport path of the sorting apparatus instead of the usual output pocket and filled there without manual intervention. A disadvantage is that the value documents that arrive at the dispenser of the sorting apparatus do not all have the same orientation due to slightly different transport processes. When a value document stack is automatically formed from these value documents and inserted in a value document cassette, the problem arises that the edges of the value documents are not disposed exactly one above the other therein. When these value documents are to be removed from the value document cassette later, for example in a self-service appliance, some value documents whose position deviates strongly cannot be automatically removed from the cassette.

SUMMARY

It is therefore the object of the invention to make available an apparatus for filling value document cassettes which allows to automatically fill value document cassettes with value document stacks.

In value document processing, it is customary to transport the value documents in value document containers before they are taken to a sorting apparatus or after they have been removed from a sorting apparatus, said value document containers—in contrast to value document cassettes—not being configured for the automatic removal of value documents in a self-service appliance. For example, banknotes are stored and transported in a cash center in value document containers, which are open at their upper side, in order to be able to insert the value documents easily and to be able to remove them therefrom—manually or automatically. The value documents contained in such value document containers can be employed for filling value document cassettes.

The apparatus according to the invention has a cassette receiving device for receiving a value document cassette, which is to be filled with the value documents from a value document container. The cassette receiving device can be configured such that the value document cassette is disposed horizontally therein. However, it can also be configured such that the value document cassette stands vertically therein or is inclined obliquely backwards.

The apparatus can also have a container receiving device for receiving at least one value document container, into which a value document container can be introduced for removing value documents and from which the respective value document container can be removed after removal of the value documents.

In addition, the apparatus has a gripping device, which is adapted to transport a value document stack from the value document container to the value document cassette. The gripping device for gripping value document stacks is configured to grip a value document stack and deposit it again. The gripping device has, for example, two gripping elements that can be moved toward each other to grip a value document.

Optionally, the apparatus has a formatting device for the automatic alignment of a value document stack removed from the value document container before said stack is inserted in the value document cassette.

In addition, the apparatus has the following:
- a transport device, with the aid of which the gripping device can be moved, in particular vertically and horizontally, to remove a value document stack from the value document container and to transport it to the value document cassette and insert it therein, wherein the removed value document stack can optionally be transported to the formatting device and from the formatting device to the value document cassette, if an alignment of the removed value document stack is required or desired.
- a control device for controlling the apparatus, in particular the transport device and the gripping device, which is configured to remove a value document stack from a value document container (e.g. received in the container receiving device) with the aid of the gripping device, to optionally insert said value document stack in the formatting device and (after the automatic formatting of the value document stack in the formatting device) with the aid of the gripping device, to remove it from the formatting device with the aid of the gripping device and to insert it in a value document cassette received in the value document cassette receiving device with the aid of the gripping device. The control device, if present in the respective case, is also configured to control the formatting device and/or a finger element described in more detail below and/or a hold-down device described in more detail below.

In contrast to the fully automatic filling of the value document cassettes by a value document sorting apparatus, a decoupling of the cassette filling process from the sorting process of the value documents is achieved by the apparatus according to the invention. For the value documents are not directly stacked in a value document cassette, but are first stacked in a value document container and only subsequently removed therefrom by means of a gripper and inserted in a value document cassette. As a result, the value document cassettes can be filled more flexibly and as needed. If necessary, an alignment of the value document stacks can be carried out in addition with the aid of the formatting device.

Optionally, the control device of the apparatus can also be configured to control the formatting device and to control the opening and closing of a window of the apparatus. These can also be controlled otherwise, however. The formatting device can have a sensor, for example, for detecting the insertion of a value document stack and for automatically starting the alignment of the same. The opening and closing of the window can also be effected manually or by pressing a button by the operator.

In the value document container from which the value document stacks are removed, one or several value document stacks are contained. For example, in the value document container, several value document stacks are separated from one another by separating elements such that they can be removed from the value document container by the gripping device separately from one another. The value document container can be arranged horizontally or vertically or obliquely in the apparatus.

The container receiving device is configured, for example, to receive at least two value document containers, which are received side by side by the container receiving device. For example, the container receiving device can have a mechanical anti-rotation protection, which ensures that the value document containers can only be received by the receiving device in a predetermined orientation. The value document containers are then asymmetrically shaped accordingly for this purpose (on their lower side or side wall), so that they can only be received by the receiving device in the predetermined orientation. The value document container can be stationary while the value document stacks are removed from the value document container. Alternatively, the value document container can also be moved while the value document stacks are removed from the value document container.

In addition to the gripping device, the apparatus preferably has a finger element, which can, for example, be attached to the transport device of the gripping device or to the cassette receiving device. The finger element is guided into the value document cassette with the aid of a traversing device before inserting the value documents, which traversing device can be attached to the transport device of the gripping device or to the cassette receiving device. By means of the traversing device, the finger element can be moved into the value document cassette independently of the gripping device. Thus, the finger element can be guided into the value document cassette independently of the gripping device. The finger element is preferably guided into the value document cassette before the gripping device is guided into the value document cassette, in order to hold or support the value document stack already disposed in the cassette by the finger element and, optionally, also to compress it against the stacking direction. For example, the finger element is guided into the value document cassette such that it is arranged at the end of the value document stack disposed in the value document cassette such that the finger element flatly touches the upper side of the top-of-stack value document of the value document stack already disposed in the value document cassette. The finger element can be one integral piece or can have two or several individual elements.

The finger element has, for example, two crescent-shaped individual elements, which are attached on opposite sides to the side of the cassette receiving device and can be pivoted from the outside into a value document cassette received in the cassette receiving device. Alternatively, the finger element can be attached to the transport device of the gripping device, so that it is moved along with the movement of the transport device.

The cassette receiving device can have a support element for supporting or holding the value document stack contained in the value document cassette to securely retain the stack shape of the value document stack during transport of the value document cassette. In particular, the support element can be configured as a slide, which is pressed against the value document stack disposed in the value document cassette.

For inserting a value document stack in the cassette, the holding function of the support element can be temporarily taken over by the finger element. During the time in which the finger element takes over this holding function, the support element can be temporarily detached from the value document stack disposed in the cassette in order to enable the insertion of a new value document stack. After inserting the new value document stack in the cassette, the support element is moved up again to the top-of-stack sheet of the value document stack and takes over this holding function again from the finger element.

In the case of a cassette receiving device with a support element, the finger element is preferably guided into the value document cassette in such a manner that it is positioned next to the support element at the end of the value document stack disposed in the value document cassette. For example, the finger element has at least two individual fingers, which are moved together by the traversing device. When the finger element is guided into the value document cassette, the slide is arranged between the individual fingers of the finger element.

The finger element is guided into the value document cassette with the aid of the traversing device at a point in time before the gripping device is guided into the value document cassette for inserting a value document stack. This is advantageous, for example, when the value document stack present is bulgy, since the bulging value document stack can be compressed with the finger element. In particular, the finger element is only pulled out of the value document cassette again when the gripping elements of the gripping device already no longer touch the value document stack upon their being moved out of the value document cassette. Alternatively, however, the finger element can also be pulled out of the value document cassette at the same time as the gripping elements of the gripping device or prior thereto.

The apparatus is configured such that the respective value document stack is introduced into the cassette by the gripper along a direction parallel to the surface of the value documents of the value document stack, in contrast to the usual stamping of a value document stack into a cassette in which the value document stacks are moved into the value document cassette along a direction perpendicular to the value document surface.

The formatting device is configured to receive one value document stack in each case, which has been removed from the value document container by the gripper. In particular, the formatting device has a bottom on which the value document stack to be formatted rests, wherein the value documents of the value document stack received in the formatting device stand on the bottom of the formatting device with their edges, preferably with their longitudinal edges. For example, the formatting device is open on its upper side opposite the bottom in order to be able to insert in the formatting device and remove the respective value document stack from the upper side of the formatting device. The bottom of the formatting device can be oriented horizontally or obliquely to the horizontal.

In one embodiment example, the formatting device for formatting the value document stack has two mutually opposite movable side walls, which are simultaneously moved toward a value document stack inserted in the formatting device in order to format the value document stack. When the value document stack is formatted, the positions of the side edges of the value documents of the value document stack are matched to one another or aligned with one another. When they are value documents of the same size, all the side edges of the value documents of the respective value document stack are flush with each other after formatting. For formatting, the mutually opposite movable side walls of the formatting device are moved once or several times toward the mutually opposite side edges of the value documents of the value document stack and moved away therefrom in order to shift protruding side edges of the value documents of the value document stack and thus match their positions to one another. The formatting device is arranged in the apparatus, for example between the container receiving device and the cassette receiving device.

The container receiving device, the cassette receiving device and the formatting device are, for example, stationary and arranged immediately next to each other. Preferably, the value document container received in the container receiving device, the value document cassette received in the cassette receiving device and the optionally present formatting device are each open on their upper side in order to remove value documents from above or to insert them from above by the gripping device. The gripping device is then arranged above the arrangement of container receiving device, cassette receiving device and optionally formatting device and is moved above these.

The apparatus preferably has a lockable housing in which the container receiving device, the cassette receiving device, the gripping device and optionally the formatting device are arranged. The housing forms a protected space which can be locked in tamper-proof manner. The lockable housing can have a transparent window on its side facing an operator, which window can be opened and locked manually or automatically for the introduction and removal of value document containers and the value document cassette. The opening of the value document container and the removal of the value documents from the value document container by the gripping device is preferably effected only after the housing with the window has been locked. The opening of the window is effected only after the value document cassette filled with value documents has been locked.

Optionally, the apparatus also has a device which is configured to open and/or close the value document containers from which the value document stacks are removed. For example, the device is configured to take off and unlock and/or to put on and lock a lid of the value document container. For example, the lid can be grasped by means of a suction cup and taken off the container or put thereon.

For several value document stacks contained in the same value document container, the gripping device consecutively carries out the following steps in each case:

a) removing the respective value document stack from the value document container (optionally received in a container receiving device),
b) optionally inserting the respective value document stack in the formatting device and removing the value document stack inserted in the formatting device after said stack has been formatted automatically,
c) inserting the (optionally formatted) removed value document stack in the value document cassette received in the cassette receiving device by means of the gripping device.

These steps a)-c) are carried out for several value document stacks that are contained in the same value document container or in different value document containers. As soon as one of the value document containers has been emptied, the removal of value document stacks from a further value document container is started, for example from a value document container arranged next to the emptied container in the container receptacle or from a value document container introduced into the apparatus after the emptied value document container.

When the gripping elements of the gripping device or a finger element disposed between the value documents are pulled out of the value document cassette, there is a risk that value documents are partially or completely pulled out of the value document cassette due to the friction with the gripping elements and/or with the finger element.

a) To prevent this, a hold-down device can be arranged immediately next to the finger element or immediately next to the gripping elements, which hold-down device holds the value documents in the value document cassette when the finger element and/or the gripping elements are pulled out. For this purpose, upon pulling out the finger element and/or the gripping elements, the hold-down device touches the upper edges of at least those ones of the value documents disposed in the value document cassette that are immediately next to the finger element and/or immediately next to the gripping elements (i.e. both the upper edges of the uppermost value document or documents of the value document stack already disposed in the value document cassette and the upper edges of the bottommost value document or documents newly inserted in the value document cassette). The hold-down device is movable independently of the gripping device. It can be shiftable relative to the gripping device in spring-mounted manner, wherein the spring force presses against the inserted value document stack, or it can be actively movable, for example pneumatically or electrically driven.

The hold-down device is attached to the transport device of the gripping device, so that it is moved along with the movement of the transport device. In comparison to a hold-down device fastened to the cassette receiving means, the hold-down device moved along can be smaller and can be employed more flexibly for different shapes of cassettes and cassette sizes.

The hold-down device remains stationary when the finger element and/or the gripping elements are pulled out, until the finger element and/or the gripping elements no longer touch the value documents of the inserted value document stack and is subsequently likewise detached from the inserted value document stack. For example, the hold-down device is configured to be plate-shaped perpendicular to the value document plane in order to touch the value documents' upper edges over a longer section along their edge and to hold them back in the value document cassette. The hold-down device can have one, two or more than two hold-down elements, which can be angled or L-shaped. The hold-down device is, for example, attached to the traversing device of the finger element, immediately next to the finger element. In one embodiment example, the hold-down device is connected to the finger element. In this case, it can be mounted on the finger element and be coupled mechanically to the finger element in such a manner that it is automatically briefly pulled out of the value document cassette by the finger element when the finger element is pulled out of the value document cassette. In a different embodiment example, the hold-down device is attached to the transport device of the gripping device, in particular immediately next to the gripping elements.

b) In order to prevent the entrainment of value documents when pulling out the finger element, the finger element—as an alternative to employing a hold-down device—can be configured as a roller finger. The roller finger has at least one individual finger, which has along its longitudinal direction two rows of rollers, which are disposed on the two opposite sides of the respective individual finger. Preferably, the rollers are actively rotated when the finger element is pulled out from the value document cassette, so that the rollers roll on the surface of the value documents. In this manner, the frictional force between the finger element and the value documents adjacent to the finger element generated upon pulling out the finger element is greatly reduced. As an alternative to driven rollers, freewheeling, ball-bearing rollers could also be employed.

c) As an alternative to a roller finger, also one or both gripping elements can be equipped accordingly with two rows of rollers, which are disposed on the two opposite sides of the respective gripping element. Preferably, the rollers are then actively rotated when the gripping element is pulled out of the value document cassette, so that the rollers roll on the surface of the value documents.

d) Alternatively or additionally, the surface of the finger element can also have a particularly low-friction material and thus the entrainment of value documents from the cassette can be prevented.

BRIEF DESCRIPTION OF THE DRAWINGS

Further advantages, features and application possibilities of the present invention will result from the following description in connection with the figures. The figures are described as follows:

FIG. 1 an exemplary embodiment of an apparatus for filling value document cassettes with value documents, FIG. 2 a-h stepwise the insertion of a value document stack in a value document cassette from above with the aid of the gripping device and employing a finger element, FIG. 3 a-g the process of formatting a value document stack with the aid of a formatting device, FIG. 4 a-b an example of a finger element configured as a roller finger, FIG. 5 a-d stepwise the insertion of a value document stack from the side in a vertically arranged value document cassette employing a finger element and a hold-down device, FIG. 6 a-e stepwise the insertion of a value document stack in a value document cassette from above employing a finger element and a hold-down device, FIG. 7 the insertion of a value document stack in an obliquely backwardly inclined value document cassette, FIG. 8 a further embodiment of a formatting device.

DETAILED DESCRIPTION OF VARIOUS EMBODIMENTS

Figure 4A:
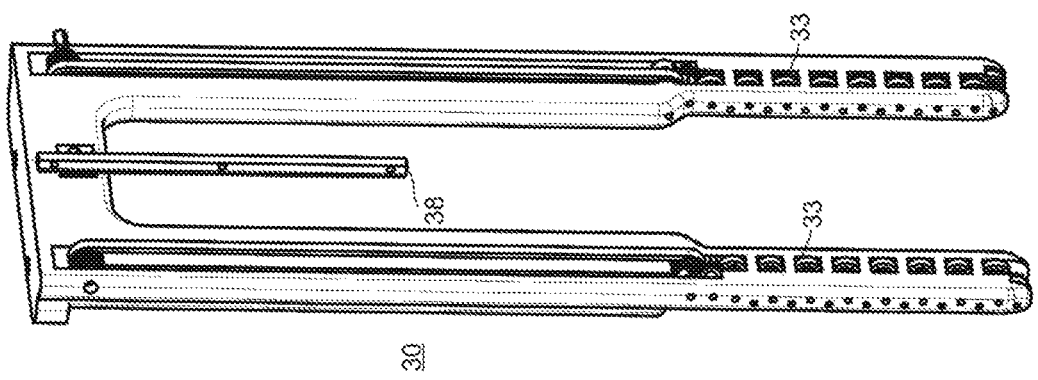

In FIG. 1, an example of an apparatus 50 for automatically filling a value document cassette 40 is shown. The apparatus 50 has a lockable housing 53, in which the automatic filling of a value document cassette 40 is carried out and in which a container receiving device 80, a cassette receiving device 41 for a value document cassette 40, a formatting device 10 and a gripping device 20 for gripping a value document stack 1 are arranged. The cassette receiving device is formed by optionally adjustable frame elements 41 which touch the value document cassette 40 on several sides of the cassette. The position of the frame elements 41 is chosen in accordance with the outer dimensions of the value document cassette 40 to be filled. For introducing the value document stacks 1, a side wall of the cassette 40 is opened.

The housing 53 of the apparatus 50 has a back wall and two transparent side walls 54 and a window that can be opened and is composed of two parts 56, 57, the window being opened for introducing the value document containers 81, 82 and the value document cassette 40. Before the start of the filling process, the window 56, 57 is locked, so that the housing 53 forms a protected tamper-proof space for the automatic filling process, which is observable from outside through the window 56, 57.

The value documents are delivered in value document containers 81, 82, which are introduced manually or automatically into the interior of the apparatus 50. The value document containers 81, 82 are placed on a receiving device 80 which, in this example, is configured to receive two document containers. The receiving device 80 has, for example, indentations matching the shape of the document container. The indentations can form an anti-twist protection and thus ensure that the document containers can be inserted only in the correct orientation. The cassette receiving device 41 can also have an anti-twist protection. Optionally, the document containers are locked with a lid, which is automatically taken off (not shown) by means of a corresponding device disposed inside the apparatus only after locking the apparatus.

The apparatus has a control device 51, which in this example is formed by a computer, which at the same time forms an operator interface for an operator. The operator can start the automatic filling process there and, optionally, change settings for the automatic filling process. The computer is programmed with corresponding software which controls the movement of the gripping device 20 for removing the value document stacks 1 from the value document containers 81, 82, for transporting the value document stacks into the formatting device 10, for removing the value document stacks 1 from the formatting device and inserting them in the value document cassette 40. Furthermore, the control device 51 controls the movement of the finger element 30 described below.

For example, several value document stacks 1 are first removed from the value document container 81 one after the other and inserted in the value document cassette 40 and, when the value document container 81 is empty, further value document stacks 1 from the value document container 82. When the value document cassette 40 is completely filled, it can be automatically locked in the interior of the apparatus and subsequently taken out of the apparatus 50. The remaining value documents of the value document container 81 can then be inserted in an empty value document cassette, which is subsequently inserted in the cassette receiving device 41. If the value document cassette 40 is to be used in an automated teller machine, the value documents inserted in the value document cassette 40 usually all have the same denomination.

Further, the apparatus 50 has a two-dimensionally displaceable transport device 55, which in this example is configured as an x-y table. In this manner, the gripping device 20 can be moved vertically (y-direction) and horizontally (x-direction) in order to remove a value document stack 1 from the value document containers 81, 82, to transport it to the formatting device 10 and to transport the formatted value document stack 1 from the formatting device 10 to the value document cassette 40 and insert it therein.

In addition to the gripping device 20, a further, only vertically displaceable traversing device 35 is attached to the transport device 55, which traversing device is displaceable independently of the transport device 55 vertically (y-direction). At the lower end of the traversing device 35, a finger element 30 is attached, which is employed when inserting the value document stacks 1 in the value document cassette 40. The finger element 30 can be lowered into the value document cassette 40 with the aid of the traversing device 35 already before the lowering of the gripping device 20, in order to hold or support a value document stack already present in the value document cassette 40, before the value document stack 1 is inserted by the gripping device 20.

The finger element 30 is employed, for example, in the case of a value document cassette 40 which has a spring-mounted lifting bottom 43 on which the value document stack 2 disposed in the cassette rests, cf. FIG. 1. On the upper side of the cassette, i.e. opposite the lifting bottom 43, a support element (slide 44) is attached to the cassette receiving device 41, which, by means of an actuator 70, is moved toward a value document stack 2 disposed in the value document cassette 40 and moves said value document stack against the spring force of the lifting bottom 43, cf. FIG. 2*a*. The value document stack 2 disposed in the cassette is held between the spring-mounted lifting bottom 43 and the slide 44.

However, also with differently configured document cassettes, which do not have a spring-mounted lifting bottom, a finger element 30 can be advantageous for inserting a value document stack 1 in order to prevent bulging or falling over of the value documents. With the aid of the finger element 30, a value document stack disposed in the cassette in which the value documents stand on their edge can be supported during the time in which—for inserting a new value document stack—a support element is temporarily detached from the value document stack in the cassette.

When a finger element 30 is employed, the following steps are performed consecutively for inserting a value document stack 1 in the value document cassette 40:

- If the value document cassette has a spring-mounted lifting bottom 43 on which the value document stack 2 disposed in the cassette rests, the lifting bottom 43 of the value document cassette is pressed back by the slide 44 disposed opposite the lifting bottom (to the left in FIG. 2*a*) so far that space is created for the value document stack 1 to be newly inserted by the gripping device 20, cf. FIG. 2*b*.
- The finger element 30, which in this example has two individual fingers 31, 32, is lowered vertically into the document cassette 40 with the aid of the traversing device 35, so that it flatly touches the upper side of a value document stack already disposed in the value document cassette and fixates the position of this value document stack 2 (optionally against the spring force of the lifting bottom 43), cf. FIG. 2*c*.
- The slide 44, which has held the value document stack 2 disposed in the cassette 40 against the spring force of the lifting bottom 43, is subsequently moved away from the value document stack 2. The finger element 30 now temporarily takes over the holding function of the slide 44 until the slide 44 takes over this holding function again after insertion of the respective value document stack 1, cf. FIG. 2*d*.
- The gripping device 20 (having two gripping elements 21, 22 in this example) which holds the value document stack 1 to be inserted is lowered into the value document cassette 40 with the aid of the transport device 55, such that the finger element 31, 32 is disposed between the value document stack 2 already disposed in the cassette and the value document stack 1 to be inserted, cf. FIG. 2*e*.
- The gripping elements 21, 22 of the gripping device 20 drive apart to release the value document stack 1 and to thereby deposit it in the value document cassette 40, cf. FIG. 2*f*. At about the same time, the slide 44 drives next to the finger element 30 toward the newly inserted value document stack 1 to hold this stack again.
- Subsequently, the gripping device 20 and the finger element 30 are moved out of the value document cassette 40 vertically upward, cf. FIG. 2*g*, 2*h*. In the case of a roller finger, the rollers of the finger element are rotated upon raising the finger element 30. In the case of a simple finger, a hold-down device is optionally employed to hold back the value documents.
- After the moving out of the gripping device 20 and of the finger element 30 from the value document cassette 40, the slide 44 can optionally be moved toward the newly inserted value document stack 1 in order to push this stack onto the value document stack 2 already disposed in the value document cassette and to merge the two value document stacks 1, 2 with each other. Alternatively, the merging of the two value document stacks 1, 2 can also be effected virtually automatically, through the elasticity of the value document stacks (bulging).

In FIG. 3*a-g*, the formatting of a value document stack in the formatting device 10 is shown. For receiving a value document stack 1 to be formatted, the formatting device 10 has a bottom 13, as well as two stationary side walls 14, 15 and two movable side walls 11, 12. At its upper side opposite the bottom, the formatting device is open, so as to be able to insert the value document stack from above.

In FIG. 3*a*, a value document stack 1 removed from the value document container by the gripping device 20 is shown, which stack is held between the gripping elements 21, 22. The gripping device 20 was moved downwards at the point in time of FIG. 3*b* in order to deposit the value document stack 1 on the bottom 13 of the formatting device 10, so that the value documents stand on their longitudinal edges. Subsequently, the two gripping elements 21, 22 drive apart somewhat to release the value document stack 1 (FIG. 3*c*). The value document stack 1 is then supported by the stationary side walls 14, 15.

For formatting the value document stack, the movable side walls 11, 12, which have been driven apart at the time of insertion, are moved toward one another with the aid of a motor 16 until the distance of the movable side walls corresponds to the length of the value documents (FIG. 3*d*). The edges of the value documents are shifted while doing so. When the positions of the value document edges are matched to one another, i.e. the value documents are aligned with one another, the value document stack is formatted. Before removing the formatted value document stack 1, the movable side walls are moved apart from each other (FIG. 3*e*). Subsequently, the gripping elements 21, 22 again approach each other in order to grip the formatted value document stack 1 (FIG. 3*f*) and to remove it again from the formatting device 10 (FIG. 3g). Subsequently, the formatted value document stack 1 is inserted in the supplied value document cassette 40 with the aid of the gripping device 20.

FIG. 8 shows a further embodiment example of a formatting device 10 which has only a bottom and one side wall standing perpendicular to it. The bottom 13 of the formatting device 10 is oriented obliquely to the horizontal (for example at least 30°) and the side wall is arranged at the lower side of the bottom. When the gripping device 20 puts the value document stack 1 on the bottom 13 and the gripping elements 21, 22 are slightly moved apart to release the value document stack 1, the value documents slip along the bottom 13 toward the side wall due to gravity and are thus aligned at their (in FIG. 8 left) edge. If necessary, the slipping of the value document stack 1 can also be supported by vibrating or shaking the oblique bottom 13 and/or the side wall.

Figure 4B:
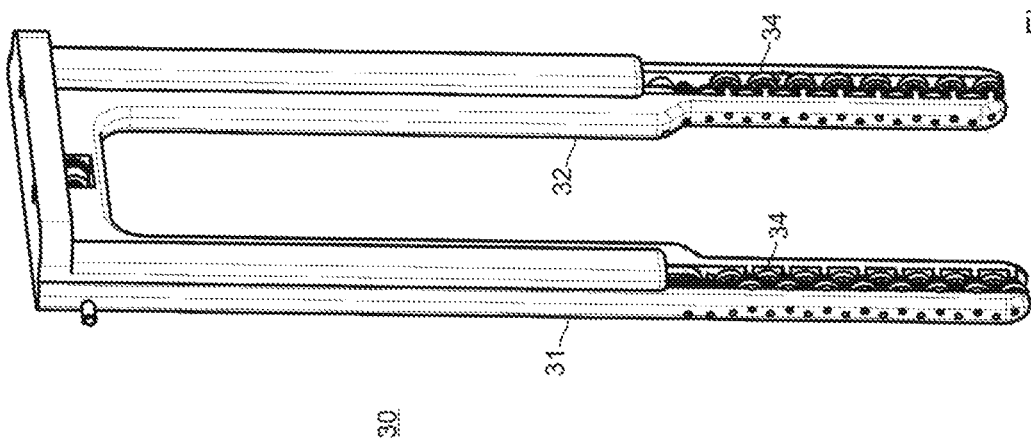

In FIG. 4a, b, a finger element 30 formed as a roller finger is shown, which in this example has two individual fingers 31, 32. FIG. 4a shows the front side and FIG. 4b shows the back side of the roller finger. Both on the front side and on the back side, the roller finger has a row of rollers 33, 34 at its end along its longitudinal direction. When a value document stack is inserted in the value document cassette, thus a first row of rollers 34 is disposed on the side of the roller finger facing the value document stack 1 and a second row of rollers 33 is disposed on the side of the roller finger facing the value documents 2 already disposed in the cassette. To keep the thickness of the roller finger low, rollers having a small diameter are preferred, for example having at most a diameter of 1 cm. The number of rollers in a row of rollers is at least 2.

Preferably, the rollers 33, 34 are actively rotated when pulling out the finger element 30 out of the value document cassette 40, so that the rollers roll on the surface of the top-of-stack value document. In this way, the frictional force between the finger element and the value documents adjacent to the finger element that is generated when pulling out the finger element is greatly reduced. In addition, the rollers can also be actively rotated when lowering the finger element into the cassette 40. The rotational speed of the rollers 33, 34 upon pulling the finger element 30 out of the value document cassette is preferably chosen such that the peripheral speed of the rollers 33, 34 corresponds to the translation speed of the finger element in its vertical upward movement. It is possible to choose exactly the same speed or, upon raising the finger element, the rollers 33, 34 can also be rotated slightly faster than the finger element is raised. The rollers belonging to the same row of rollers rotate at the same speed and are, for example, mechanically coupled with each other for this purpose. However, the rollers 33, 34 of the two rows of rollers are rotated in mutually opposite directions (the rollers 33 thus contrary to the rollers 34), so that the rollers on both sides of the finger element roll on the surface of the value documents. The rollers 33, 34 of the two rows of rollers can each be mechanically coupled to the vertical movement of the finger element 30, for example with the aid of a toothed rack 38 (shown only in FIG. 4a), so that the rollers are automatically rotated along upon the vertical movement of the finger element 30 with the correct direction and speed, cf. FIG. 4b.

FIG. 6a-e show an embodiment example in which four vertical rods, which are vertically movable by means of the traversing device 35, are employed as the finger element 30. For holding back the value documents in the value document cassette, a hold-down device 60 is used which has two L-shaped hold-down elements. One hold-down element 60 in each case has two vertical holes whose cross-section is slightly larger than the diameter of the rods. The two holes of an L-shaped hold-down element 60 surround two of the vertical rods, so that the respective hold-down element is freely movable along the two rods. In FIG. 6a, the 4 rods have been moved all the way down by means of the traversing device 35 in order to hold back the value document stack 2 already disposed in the value document cassette. The two L-shaped hold-down elements 60 rest on the upper edges of the value documents of the value document stack 1, which is to be inserted in the value document cassette 40. In FIG. 6b, the value document 1 stack has been lowered into the value document cassette 40 by means of the gripping elements 21, 22. Since the two L-shaped hold-down elements 60 rest on the upper edges of the value documents of the value document stack 1, the hold-down elements 60 slip down along the rods accordingly when the value document stack 1 is moved downwards by means of the gripping elements 21, 22. In FIG. 6c, the gripping elements 21, 22 have released the value document stack 1 again and have been moved back up. In FIG. 6d, the 4 rods were pulled upwards out of the value document cassette 40 by means of the traversing device 35 and, while doing so, have taken the two L-shaped hold-down elements 60 upwards as well. For these are mechanically coupled to the 4 rods via pins that protrude laterally from the rod at the lower end of the respective rod and thus avoid a slipping out of the two L-shaped hold-down elements 60 at the lower end of the rods. In FIG. 6e, the two value document stacks 1 and 2 have been pushed together by means of a slide 44 and thereby merged into one stack. As an alternative to the two L-shaped hold-down elements 60, one individual (wider) hold-down element 60 can also be used. Instead of 4 rods, 2 rods can also be used as the finger element 30.

In FIG. 5a-d, an embodiment example is shown, in which the value document cassette 40 is arranged vertically in a cassette receiving device 41 and the value documents lie on top of each other in the value document cassette 40. In this embodiment example, a finger element 30 and a hold-down device 60 are employed, both of which are attached to the transport device 55 of the gripping device 20 and are actively movable relative to the transport device 55 independently of each other (and independently of the gripping elements 21, 22). The finger element 30 is, for example, formed as a single piece and plate-shaped perpendicular to the drawing plane. In the embodiment example of FIG. 5a-d, the finger element 30 is employed for compressing a value document stack 2 disposed in a value document cassette 40, which stack is bulgy. The hold-down device 60 has, for example, two angle-shaped hold-down elements, one of which is disposed in front of the gripping elements 21, 22 in FIG. 5a-d, and one of which behind them, so that the value document stack 1 is held back on both sides of the gripping elements 21, 22 when the gripping elements 21, 22 are pulled out of the value document cassette 40.

The value document stack 1 was removed from a value document container 81 by the gripping elements 21, 22 of the gripping device 20, which container is disposed, for example, in the cassette receiving device 41 (not shown in FIG. 5a-d). Optionally, the side edges of the value documents of the removed value document stack 1 can have been aligned in a formatting device 10.

In FIG. 5a, the finger element 30, which is disposed directly below the gripping element 21, has been guided into the value document cassette 40 and placed above the uppermost value document of the value document stack 2 there. Subsequently, the transport device 55 is moved downwards (see arrow) in order to compress the bulging value document stack 2 with the aid of the finger element 30 (cf. FIG. 5b). In FIG. 5c, the transport device 55 has then been moved to the left in order to introduce the value document stack 1 gripped by the gripping elements 21, 22 into the free space created above the finger element 30 in the upper part of the value document cassette 40. The hold-down device 60 is likewise moved to the left until it rests against the value document edges of both value document stacks 1, 2. The gripping elements 21, 22 are moved slightly apart for releasing the value document stack 1. Subsequently, the transport device 55 is moved to the right in order to pull the gripping elements 21, 22 out of the value document cassette 40. The finger element 30 is likewise pulled out of the value document cassette 40 (to the right). When pulling out the finger element 30, the hold-down device 60 holds the value documents of the two value document stacks 1, 2, which are disposed in the vicinity of the finger element 30, in the value document cassette 40, so that they are not pulled out along with the finger element 30 by friction, cf. FIG. 5d.

FIG. 7 shows a simple embodiment example in which a finger element 30 is dispensed with. It can be used if the value document stack is not or hardly bulgy, for example when said stack is composed of little used or freshly printed value documents, and the value document stack 2 is not pressed upward either by a spring-mounted lifting bottom. A hold-down device 60 can likewise be dispensed with in the embodiment example of FIG. 7. In order to prevent the entrainment of value documents, in the embodiment example of FIG. 7, the value document cassette 40 is received in a cassette receiving device 41 in which the value document cassette 40 is inclined obliquely backwards, so that the value document stack is pressed against both the bottom and against one back wall of the value documents cassette by its gravity. In comparison to the vertical arrangement of the value document cassette 40, the value document-document stack to be inserted can simply slide down from the lower gripping element 21 due to its gravity and can thus be dropped into the value document cassette 40. In comparison to the horizontal arrangement of the value document cassette 40, the oblique arrangement is advantageous, since the upper end of the value document stack 2 does not need to be supported due to the gravity of the value documents.

If necessary, however, a hold-down device 60 can also be used in the embodiment example of FIG. 7 for holding back the value documents when pulling out the gripping elements 21, 22. In addition, a particularly low-friction material can be employed for the gripping elements 21, 22.

The invention claimed is:

1. An apparatus for filling a value document cassette, having
a cassette receiving device for receiving a value document cassette,
a gripping device for gripping a value document stack,
a transport device for moving the gripping device, which is configured to remove a value document stack from a value document container with the aid of the gripping device, and to transport said stack to the value document cassette received in the cassette receiving device and insert it in the value document cassette,
a control device for controlling the apparatus, in particular for controlling the transport device and the gripping device,
wherein the apparatus has a hold-down device which is adapted to hold back the value documents in the value document cassette when gripping elements of the gripping device are pulled out of the value document cassette,
wherein the hold-down device is movable horizontally along with movement of the transport device when transporting the value document stack from the value document container to the value document cassette with the aid of the gripping device,
wherein the hold-down device touches upper edges at least of those value documents disposed in the value document cassette which are present in the value document cassette immediately next to the gripping elements.

2. The apparatus according to claim 1, wherein the cassette receiving device is configured such that the value document cassette received in the cassette receiving device is inclined obliquely backwards upon insertion of the value documents.

3. An apparatus for filling a value document cassette, having
a cassette receiving device for receiving a value document cassette,
a gripping device for gripping a value document stack, the gripping device including at least two gripping elements configured to be moved toward each other to grip the value document stack between the at least two gripping elements,
a transport device for moving the gripping device, which is configured to remove a value document stack from a value document container with the aid of the gripping device, and to transport said stack to the value document cassette received in the cassette receiving device and insert it in the value document cassette,
a control device for controlling the apparatus, in particular for controlling the transport device and the gripping device,
wherein the apparatus, in addition to the gripping device, has a finger element which is guided into the value document cassette independently of the gripping device, for inserting the value document stack,
wherein the finger element is movable along with the movement of the transport device of the gripping device or is attached to the cassette receiving device.

4. The apparatus according to claim 3, wherein the cassette receiving device is configured such that the value document cassette received in the cassette receiving device is inclined obliquely backwards upon insertion of the value documents.

5. The apparatus according to claim 3, wherein the apparatus has a traversing device by means of which the finger element is displaceable independently of the gripping device,
wherein the traversing device is attached in particular to the transport device of the gripping device or to the cassette receiving device.

6. The apparatus according to claim 5, wherein the control device is adapted to control the traversing device such that the finger element is guided into the value document cassette and thereby positioned at an end of a value document stack disposed in the value document cassette, such that it flatly touches an upper side of a top-of-stack value document of the value document stack disposed in the value document cassette.

7. The apparatus according to claim 3, wherein the control device is configured to guide the finger element into the value document cassette with the aid of the traversing device at a point in time before the gripping device is guided into the value document cassette for inserting a value document stack.

8. The apparatus according to claim 3, wherein the control device is configured to pull the finger element out of the value document cassette again with the aid of the traversing device only when the gripping device already no longer touches the value document stack upon its being moved out of the value document cassette.

9. The apparatus according to claim 3, wherein the control device is configured to guide the finger element into the value document cassette with the aid of the traversing device at a point in time before the gripping device is guided into the value document cassette for inserting a value document stack in order to compress the value document stack already disposed in the cassette by the finger element against the stacking direction of the value document stack.

* * * * *